(12) United States Patent
Dekel et al.

(10) Patent No.: US 11,880,325 B2
(45) Date of Patent: Jan. 23, 2024

(54) DETECTING AND HANDLING A COEXISTENCE EVENT

(71) Applicant: TEXAS INSTRUMENTS INCORPORATED, Dallas, TX (US)

(72) Inventors: Eli Dekel, Tzur Igal (IL); Yaron Alpert, Hod Hasharon (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/533,046

(22) Filed: Nov. 22, 2021

(65) Prior Publication Data
US 2023/0161724 A1    May 25, 2023

(51) Int. Cl.
*G06F 13/42* (2006.01)
*G06F 13/38* (2006.01)

(52) U.S. Cl.
CPC ........ *G06F 13/382* (2013.01); *G06F 13/4282* (2013.01); *G06F 2213/0038* (2013.01)

(58) Field of Classification Search
CPC ............... G06F 13/382; G06F 13/4282; G06F 2213/0038
See application file for complete search history.

(56) References Cited

U.S. PATENT DOCUMENTS

| | | | |
|---|---|---|---|
| 2008/0307134 A1* | 12/2008 | Geissler | G06F 13/4291 710/110 |
| 2013/0058316 A1 | 3/2013 | Hirsch et al. | |
| 2013/0322462 A1* | 12/2013 | Poulsen | H04L 7/10 370/458 |
| 2014/0068314 A1* | 3/2014 | Kim | G06F 1/28 713/340 |
| 2016/0147684 A1* | 5/2016 | Sengoku | G06F 13/4282 710/105 |
| 2016/0335149 A1* | 11/2016 | David | G06F 11/0706 |
| 2019/0065243 A1* | 2/2019 | Eckert | G06F 1/3225 |
| 2019/0361833 A1* | 11/2019 | Huang | G06F 13/4068 |
| 2020/0019524 A1* | 1/2020 | Mishra | G06F 13/366 |
| 2020/0042074 A1* | 2/2020 | Messick | G06F 1/263 |
| 2020/0236640 A1 | 7/2020 | Jiang et al. | |
| 2021/0216490 A1* | 7/2021 | Kumar | G06F 13/4282 |

* cited by examiner

*Primary Examiner* — Henry Tsai
*Assistant Examiner* — Harry Z Wang
(74) *Attorney, Agent, or Firm* — Mandy Barsilai Fernandez; Frank D. Cimino (57) ABSTRACT

A method includes detecting, by a coexistence controller of a system on a chip (SoC), an occurrence of a coexistence event of an SoC component; providing, by the coexistence controller, an indication of the occurrence of the coexistence event to a coexistence coordinator; and changing, by the coexistence controller, an operating point of the SoC from a current operating point to a new operating point responsive to receiving an operating point change request from the coexistence coordinator.

22 Claims, 4 Drawing Sheets

DETECTING AND HANDLING A COEXISTENCE EVENT

SUMMARY

In accordance with an example of the disclosure, a method includes detecting, by a coexistence controller of a system on a chip (SoC), an occurrence of a coexistence event of an SoC component; providing, by the coexistence controller, an indication of the occurrence of the coexistence event to a coexistence coordinator; and changing, by the coexistence controller, an operating point of the SoC from a current operating point to a new operating point responsive to receiving an operating point change request from the coexistence coordinator.

In accordance with another example of the disclosure, a device includes a system on a chip (SoC) having at least one SoC component. The device also includes a coexistence controller coupled to the SoC. The coexistence controller is configured to detect an occurrence of a coexistence event of the SoC component, provide an indication of the occurrence of the coexistence event to a coexistence coordinator, and change an operating point of the SoC from a current operating point to a new operating point responsive to receiving an operating point change request from the coexistence coordinator.

In accordance with yet another example of the disclosure, a non-transitory, computer-readable medium includes instructions that, when executed by a processor, cause the processor to be configured to detect an occurrence of a coexistence event of a system on a chip (SoC) component, provide an indication of the occurrence of the coexistence event to a coexistence coordinator, and change an operating point of the SoC from a current operating point to a new operating point responsive to receiving an operating point change request from the coexistence coordinator.

BRIEF DESCRIPTION OF THE DRAWINGS

For a detailed description of various examples, reference will now be made to the accompanying drawings in which.

DETAILED DESCRIPTION

Electronic devices are often designed to provide increasing amounts of functionality using a reduced number of integrated circuits. Such electronic devices include smartphones, Internet-of-Things (IoT) devices, and the like. In some cases, an electronic device includes a system on a chip (SoC) in which many of the components of the electronic device are integrated onto a single integrated circuit (IC). These components can include a central processing unit (CPU), memory (e.g., internal or integrated to the SoC, or external memory accessed via a memory interface), general purpose input/output (GPIO) interfaces, radio frequency (RF) interfaces, analog interfaces (e.g., an analog to digital converter (ADC)), wired interfaces (e.g., Universal Asynchronous Receiver-Transmitter (UART), Serial Peripheral Interface (SPI), Universal Serial Bus (USB)), power and clock control interfaces, various sensor (e.g., environmental sensors) interfaces, and other interfaces. The RF interface(s) provide the ability to communicate using one or more wireless protocols (e.g., cellular, Wi-Fi, Bluetooth, Bluetooth Low Energy (BLE), and the like). The foregoing components, or interfaces that enable communication between various components of the SoC, are generally referred to as SoC components.

Due in part to the integrated nature of an SoC (or other ICs of an electronic device), coexistence issues can arise between the various SoC components—particularly those that are integrated in the SoC and/or controlled by the SoC—and/or functions provided by the SoC. For example, performance tradeoffs may exist between a first component and a second component of the SoC, in which increasing the performance or operation capability of the first SoC component has a negative impact on the performance or operation capability of the second SoC component. In some cases, the activity of the first SoC component can degrade the performance of the second SoC component, or even block concurrent activity of the second SoC component. As one specific example, the SoC may not be capable of maximizing or providing a relatively high output power of an RF SoC component (e.g., BLE), while also maximizing or providing a relatively high sampling rate of the ADC SoC component.

An SoC-level operating point refers to a combination of concurrent performance or operation capabilities of multiple SoC components (e.g., a set of SoC component-specific operation profiles or parameter configurations), which also satisfies a limiting factor, such as total power consumption level of the SoC, a thermal rise (e.g., relative to a baseline temperature) of the SoC, or a longevity (e.g., ability to maintain a particular performance level over time) of the SoC. For example, as explained above, in some cases multiple SoC components are not able to concurrently operate at each of their highest performances or operation capabilities. Accordingly, an example of a first operating point includes a first SoC component (e.g., BLE) operating at a relatively higher performance or operation capability (e.g., a higher output power), and a second SoC component (e.g., ADC) operating at a relatively lower performance or operation capability (e.g., a reduced sampling rate), such as to satisfy a total power consumption level for the SoC (or other SoC limiting factor). An example of a second operating point includes the first SoC component operating at a relatively lower performance or operation capability, and the second SoC component operating at a relatively higher performance or operation capability, while maintaining a similar total power consumption level for the SoC (e.g., satisfying an SoC limiting factor).

A key performance indicator (KPI) refers to a metric or value that quantifies a coupled performance level of multiple SoC components of the device or SoC. In some cases, a particular KPI can be improved by choosing a particular SoC-level aggregated operating point (e.g., a set of operating points for some or all of the SoC components). Examples of operation KPIs include a response time of a specific SoC component, service availability (e.g., an amount of time in which a particular action is completed), accuracy of an action (e.g., ADC resolution or accuracy, RF transmission error rate, interface (e.g., UART) error rate), external memory read/write error probability, throughput, and power consumption (e.g., SoC-level power consumption, or power consumption of a specific SoC component), among others.

In some cases, to enable simultaneous operation of various SoC components, coexistence solutions are implemented between RF interfaces, so that the electronic device is able to communicate using multiple wireless protocols concurrently (or apparently concurrently to the user). In these cases, the coexistence solution(s) do not consider the interrelatedness of, and impact on, performance or operation capabilities of various other types of SoC components, such as those described above. Also, despite the fact that a user is impacted, the user of an electronic device is generally not aware of a coexistence-related problem (or its impact on device performance) between SoC components, nor is the user able to influence the electronic device (e.g., an operating point of the electronic device) to resolve such coexistence-related problems.

Examples of this description address the foregoing by providing a coexistence controller as part of the SoC. The coexistence controller can be implemented as hardware of the SoC (e.g., an application-specific integrated circuit (ASIC) of the SoC), as software executed by the SoC, or as a combination of hardware and software. The coexistence controller is configured to detect the occurrence of a coexistence event. Coexistence events are events or actions that impact, influence, or otherwise change (or cause a deviation from) the operating point of the SoC (e.g., that cause modification to the operating points of other SoC components). One example of a coexistence event is an operating metric of at least one SoC component indicating a relative decrease in performance relative to a current SoC operating point (e.g., being below or above a threshold). Another example of a coexistence event is the occurrence of an action (e.g., a user action) that could be improved by modifying the SoC operating point, or by one or more of the SoC components being configured to provide additional performance capabilities beyond what is allowed for by the current SoC operating point. For example, a coexistence event occurs after repeated uses (e.g., above a threshold amount) of the ADC, while the current operating point reduces ADC performance in favor of increasing performance of another SoC component. In another example, a coexistence event occurs responsive to a number of accesses to or uses of a shared hardware component (e.g., a memory, a microcontroller unit (MCU), a hardware accelerator) by different processes of the SoC being above a threshold amount. In another example, a coexistence event occurs responsive to a number of accesses to or uses of a shared wired interface by different processes of the SoC being above a threshold amount.

The coexistence controller is configured to provide an indication of the occurrence of the coexistence event to a coexistence coordinator. The coexistence coordinator can be located on the electronic device, such as software executed by the SoC, or can be located remote to the electronic device, such as a cloud-based application. In one example, the coexistence coordinator is configured to provide the indication of the occurrence of the coexistence event to a user (e.g., on a graphical user interface (GUI) of the electronic device that includes the SoC), and to receive a user input to perform a coexistence action, such as altering an operating point of the electronic device (e.g., transition from the current operating point to a new operating point), to address the coexistence event. For example, the user input can cause the device to transition to an operating point that supports the SoC component use that triggered the coexistence event (e.g., increased ADC usage). The coexistence action (e.g., change of operating point) can reduce the power consumption of a particular component, improve the throughput of a particular SoC component, improve the latency response of a particular component, and/or increase efficiency in utilization of other SoC resources.

The user is thus able to dynamically alter the operating point of the electronic device in response to the occurrence of the coexistence event, such as to mitigate the occurrence of similar coexistence events thereafter. Continuing the above example, in which actions and/or device usage indicate an increase in demand for ADC performance, the coexistence coordinator is configured to present the user with an indication that a current demand for ADC performance exceeds that which is permitted by the current operating point. The user is then able to select a new operating point that increases ADC performance. In some cases, the new operating point can decrease the performance of another SoC component to permit the increased ADC performance, while still satisfying the limiting factor(s) described above.

Responsive to the user selecting a new operating point, the coexistence coordinator provides an indication of the user selection to the coexistence controller, which changes the performance or operating characteristics of the SoC components associated with the change from the current operating point to the new operating point.

Various application program interfaces (APIs) are provided between the coexistence coordinator, the coexistence controller, and the components of the SoC being controlled that enable the foregoing functionality.

In some examples, the coexistence controller is also configured to receive a query (e.g., from a coexistence coordinator). The query includes a potential change to the operating point of the SoC. The coexistence controller is configured to determine an impact of the potential operating point change on the coexistence of two or more SoC components, and to provide an indication of the impact to the coexistence coordinator.

This enables a user of the electronic device to appreciate the potential impact(s) of an operating point change before deciding to make the change to the electronic device. As one example, the user may wish to increase battery performance of the electronic device, which has a resulting negative impact on the performance or operating capability of one or more SoC components (e.g., reducing BLE output power, reducing ADC sampling rate). Responsive to the user query regarding increasing the battery performance of the electronic device, the coexistence controller determines that BLE output power will need to be reduced, and/or that ADC sampling rate will need to be decreased, and provides an indication of those impacts to the user through the coexistence coordinator.

Figure 1:
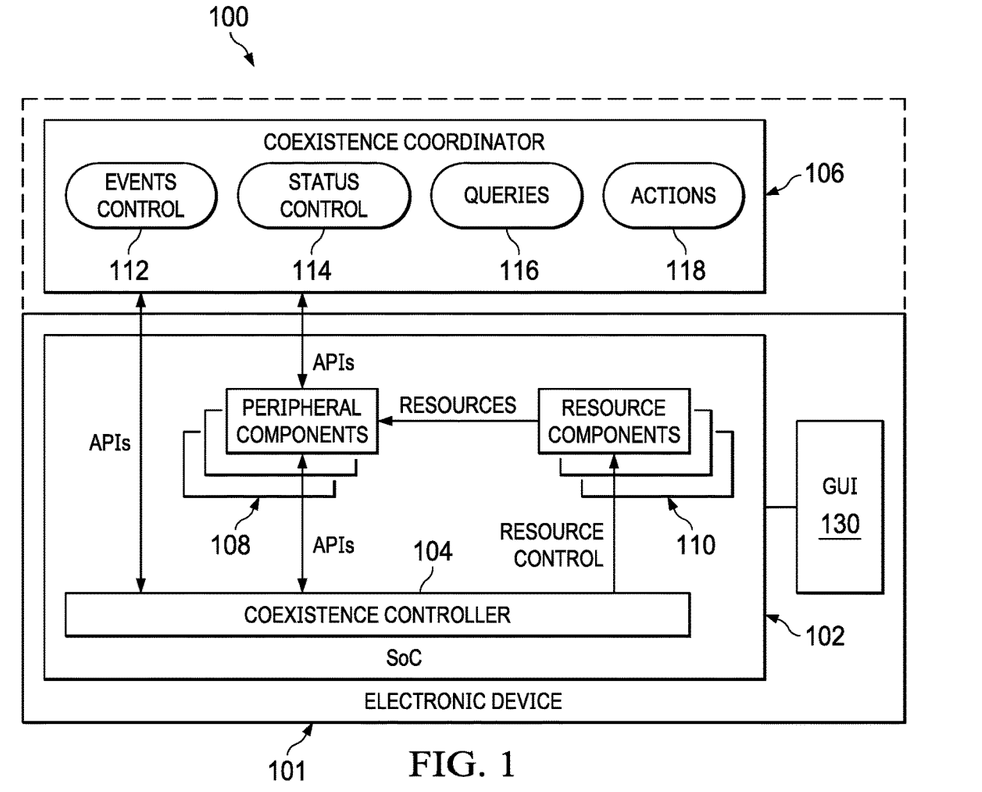
FIG. 1 is a block diagram of a system for detecting and handling a coexistence event in accordance with various examples.

FIG. 1 is a block diagram of a system 100 in accordance with examples of this description. The system 100 includes an electronic device 101 that has an SoC 102, which in turn includes a coexistence controller 104. The system 100 also includes a coexistence coordinator 106 that is coupled to the SoC 102 and, in particular, is coupled to the coexistence controller 104 implemented on the SoC 102.

The SoC 102 also includes peripheral components 108 and resource components 110, which schematically represent the various SoC components described above. For example, the peripheral components 108 include peripheral connectivity and/or information acquisition interfaces, or processing accelerator interfaces. Continuing this example, the resource components 110 include controllers, such as memory controllers, power controllers, access controllers, and the like. The specific peripheral components 108 and resource components 110 described above are exemplary. For example, the SoC 102 may include other, additional components than those described above, and the SoC 102 does not necessarily include every component described above.

In an example, the coexistence controller 104 is implemented as hardware of the SoC 102, such as by an ASIC of the SoC 102. In another example, the coexistence controller 104 is implemented as software executed by the SoC 102 (e.g., by a processor of the SoC 102). In yet another example, the coexistence controller 104 is implemented as a combination of hardware of the SoC 102 and software executed by the SoC 102. In some examples, the coexistence coordinator 106 is located on the electronic device 101 that includes the SoC 102, and can be implemented as software executed by the SoC 102 and/or as hardware of the SoC 102. In other examples, the coexistence coordinator 106 is located remote from the electronic device 101 that includes the SoC 102, such as being implemented as a cloud-based application, or other application with which the electronic device 101 communicates.

Irrespective of the particular implementations of the coexistence controller 104 and the coexistence coordinator 106, the coexistence controller 104 and the coexistence coordinator 106 are configured to communicate using various API(s). These API(s) enable requests (e.g., queries), responses, event indications, commands, and other types of communication between the coexistence controller 104 and the coexistence coordinator 106.

The coexistence controller 104 is configured to detect the occurrence of a coexistence event. As described above, a coexistence event is an event or an action that impacts, influences, or otherwise changes an operating point of the SoC 102. The SoC 102 operating point is a combination of concurrent performance or operation capabilities of multiple SoC 102 components, such as the peripheral components 108 and/or the resource components 110. The SoC 102 operating point satisfies a limiting factor, such as a total power consumption of the SoC 102, a thermal rise of the SoC 102, or a longevity or ability to maintain a performance level over time of the SoC 102.

In an example, reference is made to a BLE component of the SoC 102 and an ADC component of the SoC 102. The BLE component and the ADC component are examples of peripheral components 108. In this example, an operation capability of the BLE component is an output power value, with a greater output power representing a greater operation capability of the BLE component, and a lesser output power representing a lesser operation capability of the BLE component. Continuing this example, an operation capability of the ADC component is a sampling rate value, with a greater sampling rate representing a greater operation capability of the ADC component, and a lesser sampling rate representing a lesser operation capability of the ADC component. In this example, the limiting factor for an operating point is a power consumption level for the SoC 102.

At a first example operating point, the output power of the BLE component is a first value and the sampling rate of the ADC is a second value, while the power consumption of the SoC 102 is at or below a third value. Because the power consumption of the SoC 102 is a limiting factor for the operating point, it may not be possible to increase the output power of the BLE component above the first value while maintaining the sampling rate of the ADC at the second value. Similarly, it may not be possible to increase the sampling rate of the ADC above the second value while maintaining the output power of the BLE component at the first value. Accordingly, a "tradeoff" between the operation capabilities of the BLE and ADC components is useful to achieve a different operating point.

At a second example operating point, the output power of the BLE component is a fourth value that is greater than the first value, while the sampling rate of the ADC is a fifth value that is less than the second value. The second operating point satisfies the limiting factor that the power consumption of the SoC 102 is at or below the third value.

At a third example operating point, the output power of the BLE component is a sixth value that is less than the first value, while the sampling rate of the ADC is a seventh value that is greater than the second value. The third operating point also satisfies the limiting factor that the power consumption of the SoC 102 is at or below the third value. The second and third operating points demonstrate the tradeoffs between operation capabilities of the BLE and ADC components, while still satisfying the limiting factor that the power consumption of the SoC 102 be at or below the third value.

In one example, a coexistence event occurs when the output power of the BLE component is less than the expected value for a given operating point, which indicates a possible coexistence problem because the BLE component is underperforming relative to its expected operation capability at the given operating point. For example, at the first operating point, a coexistence event occurs when the output power of the BLE component is less than the first value. At the second operating point, a coexistence event occurs when the output power of the BLE component is less than the fourth value. At the third operating point, a coexistence event occurs when the output power of the BLE component is less than the sixth value.

Similarly, a coexistence event occurs when the sampling rate of the ADC component is less than the expected value for a given operating point, which indicates a possible coexistence problem because the ADC component is underperforming relative to its expected operation capability at the given operating point. For example, at the first operating point, a coexistence event occurs when the sampling rate of the ADC component is less than the second value. At the second operating point, a coexistence event occurs when the sampling rate of the ADC component is less than the fifth value. At the third operating point, a coexistence event occurs when the sampling rate of the ADC component is less than the seventh value.

Irrespective of which of the particular scenarios described above causes the coexistence event, the occurrence of such a coexistence event indicates that one of the components of the SoC 102 (e.g., peripheral components 108, such as the BLE component and/or ADC component, or resource components 110) is underperforming, which can be responsive to a coexistence issue with another of the SoC 102 components. As described below, the coexistence controller 104 is configured to change an operating point of the SoC 102 from the current operating point to a new operating point, such as responsive to receiving an operating point change request from the coexistence coordinator 106.

In an example, changing to the new operating point of the SoC 102 can be to improve performance of the SoC 102 component whose underperformance led to the occurrence of the coexistence event. For example, if the coexistence event occurred responsive to the output power of the BLE component being less than the expected value for the current operating point, the new operating point allows for a greater output power for the BLE component (e.g., the current operating point is the first operating point, and the new operating point is the second operating point). If the coexistence event occurred responsive to the sampling rate of the ADC component being less than the expected value for the current operating point, the new operating point allows for a greater sampling rate for the ADC component (e.g., the current operating point is the first operating point, and the new operating point is the third operating point). Accordingly, the coexistence controller 104 changing the SoC 102 operating point to the new operating point can be to improve performance of the underperforming SoC 102 component.

A coexistence event also occurs when an action occurs (e.g., a user action) that indicates a performance demand for the SoC 102 component greater than what is available at the current operating point of the SoC 102. In this example, a coexistence event occurs when a demand (e.g., from a user action or an application executed by the SoC 102) for output power of the BLE component is greater than the value provided by a given operating point, which indicates a possible coexistence problem because a demand for the BLE component is greater than its operation capability at the given operating point. The demand from the user action or application can also be indicated by a number of repeated uses or attempted uses (e.g., per unit of time) being greater than a threshold.

For example, at the first operating point, a coexistence event occurs when a demand for BLE output power is greater than the first value. At the second operating point, a coexistence event occurs when a demand for BLE output power is greater than the fourth value. At the third operating point, a coexistence event occurs when a demand for BLE output power is greater than the sixth value. A coexistence event can also occur responsive to repeated uses or attempted uses of the BLE component (e.g., per unit of time) being greater than a threshold.

Similarly, a coexistence event occurs when a demand (e.g., from a user action or an application executed by the SoC 102) for ADC sampling rate is greater than the value provided by a given operating point, which indicates a possible coexistence problem because a demand for the ADC component is greater than its operation capability at the given operating point. The demand from the user action or application can also be indicated by a number of repeated uses or attempted uses (e.g., per unit of time) being greater than a threshold.

For example, at the first operating point, a coexistence event occurs when a demand for ADC sampling rate is greater than the second value. At the second operating point, a coexistence event occurs when a demand for ADC sampling rate is greater than the fifth value. At the third operating point, a coexistence event occurs when a demand for ADC sampling rate is greater than the seventh value. A coexistence event can also occur responsive to repeated uses or attempted uses of the ADC component (e.g., per unit of time) being greater than a threshold.

Irrespective of which of the particular scenarios described above causes the coexistence event, the occurrence of such a coexistence event indicates that one of the components of the SoC 102 (e.g., peripheral components 108, such as the BLE component and/or ADC component, or resource components 110) is underperforming relative to a user-based or application-based demand. As described below, the coexistence controller 104 is configured to change an operating point of the SoC 102 from the current operating point to a new operating point, such as responsive to receiving an operating point change request from the coexistence coordinator 106.

In an example, changing to the new operating point of the SoC 102 can be to improve performance of the SoC 102 component that is experiencing a higher-than-expected (e.g., relative to the current operating point) demand, which led to the occurrence of the coexistence event. For example, if the coexistence event occurred responsive to a demand for BLE output power being greater than the expected value for the current operating point, the new operating point allows for a greater output power for the BLE component (e.g., the current operating point is the first operating point, and the new operating point is the second operating point). If the coexistence event occurred responsive to a demand for ADC sampling rate being greater than the expected value for the current operating point, the new operating point allows for a greater sampling rate for the ADC component (e.g., the current operating point is the first operating point, and the new operating point is the third operating point). Accordingly, the coexistence controller 104 changing the SoC 102 operating point to the new operating point can be to improve performance of the underperforming SoC 102 component.

Figure 2:
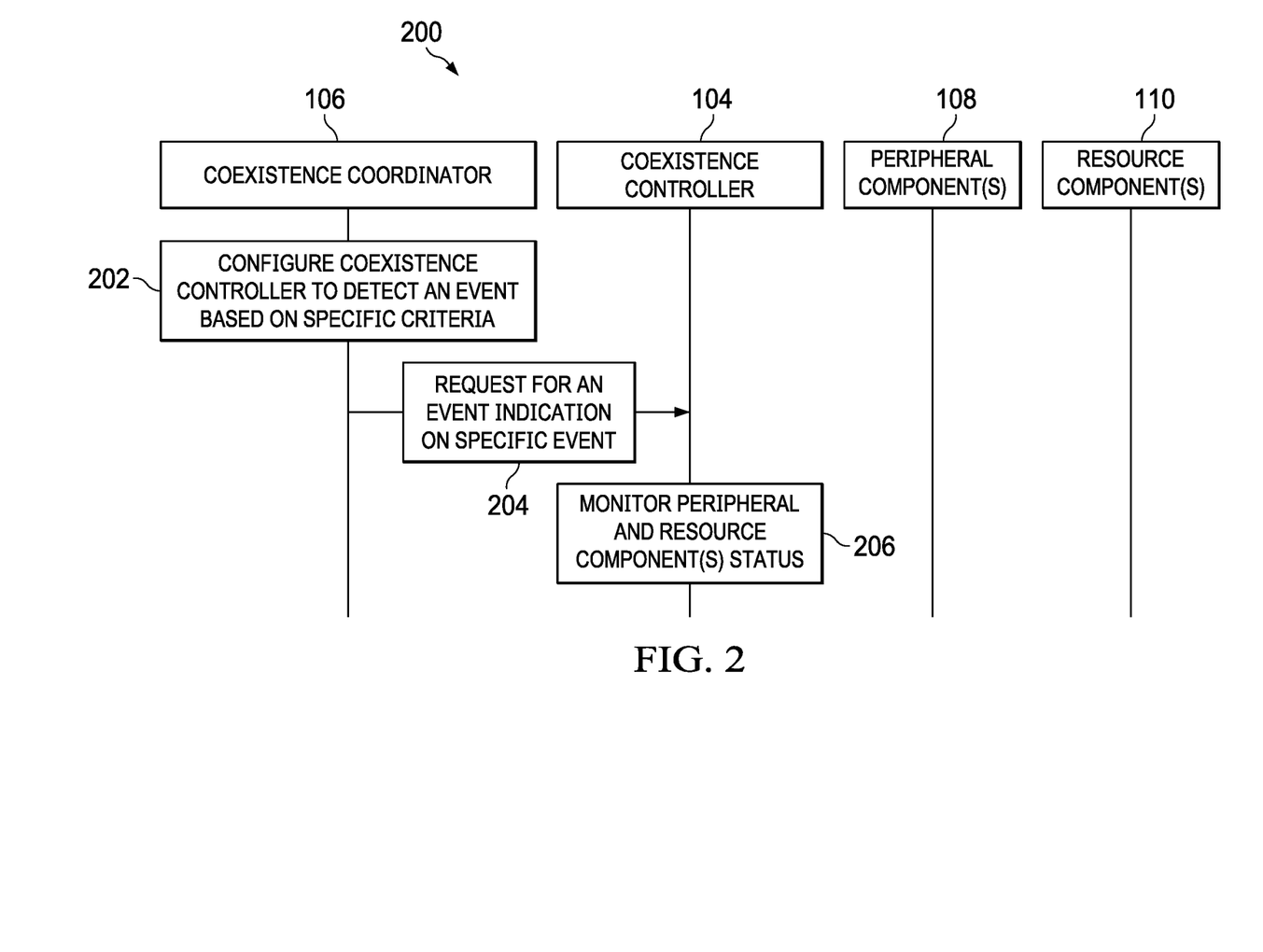
FIG. 2 is a timing diagram of a configuration function implemented by a coexistence coordinator and a coexistence controller in accordance with various examples.

FIG. 2 is a timing diagram 200 that illustrates a configuration function implemented by the coexistence coordinator 106 (or an events control engine 112 thereof) and the coexistence controller 104. The configuration function enables the coexistence coordinator 106 to define specific criteria by which the coexistence controller 104 detects a coexistence event.

For example, at block 202, the coexistence coordinator 106 determines to configure the coexistence controller 104 to detect a coexistence event responsive to the occurrence of certain criteria. In some examples, the coexistence coordinator 106 determines to configure the coexistence controller 104 responsive to receiving an indication that the electronic device 101 is in a powered state (e.g., has been turned on, or has woken up from a standby state).

At block 204, the events control engine 112 of the coexistence coordinator 106 sends a request or a message to the coexistence controller 104. The request or message includes the specific criteria by which the coexistence controller 104 detects a coexistence event. Responsive to receiving the request or message at block 206, the coexistence controller 104 is configured to begin monitoring the peripheral components 108 and/or the resource components 110 according to the specified coexistence event criteria.

In one example, the criteria to determine the occurrence of a coexistence event include a throughput of an activity (e.g., a function implemented by the peripheral components 108 and/or the resource components 110) being less than a specified threshold, or the activity not satisfying a minimum throughput target value. Accordingly, a coexistence event occurs responsive to the activity throughput being less than the threshold, or not satisfying the minimum target value in this example. The coexistence controller 104 is thus configured to detect such a coexistence event in this example.

In another example, the criteria to determine the occurrence of a coexistence event include an amount of time and/or power consumed by an activity being greater than a specified threshold. Accordingly, in this example, a coexistence event occurs responsive to the activity consuming a greater amount of power than permitted by the threshold, or taking a longer time to complete than permitted by the threshold. The coexistence controller 104 is thus configured to detect such a coexistence event in this example.

In yet another example, the criteria to determine the occurrence of a coexistence event include an activity start time being delayed by more than a threshold amount of time beyond an expected start time, or the activity having a latency greater than a threshold amount. Accordingly, in this example, a coexistence event occurs responsive to the activity having a greater latency than permitted by the threshold. The coexistence controller 104 is thus configured to detect such a coexistence event in this example.

In a further example, the criteria to determine the occurrence of a coexistence event include a request to begin an activity being rejected by the implementing peripheral components 108 and/or the resource components 110 more than a threshold number of times. Accordingly, in this example, a coexistence event occurs responsive to requests to begin the activity being rejected a number of times greater than permitted by the threshold. The coexistence controller 104 is thus configured to detect such a coexistence event in this example.

In still another example, the criteria to determine the occurrence of a coexistence event include a system resource (e.g., one or more of the peripheral components 108 and/or the resource components 110) being occupied to implement an activity for an amount of time greater than a threshold amount. Accordingly, in this example, a coexistence event occurs responsive to the activity being implemented on the system resource for an amount of time greater than permitted by the threshold. The coexistence controller 104 is thus configured to detect such a coexistence event in this example.

In some examples, the coexistence event criteria specified by the message at block 204 includes one of the above criteria, or combinations of the above criteria. For example, the coexistence event criteria can specify that a coexistence event occurs responsive to both a first criterion and a second criterion being satisfied, or responsive to either of the first criterion and the second criterion being satisfied. Other such logical combinations of coexistence event criteria are similarly within the scope of this description.

Figure 3:
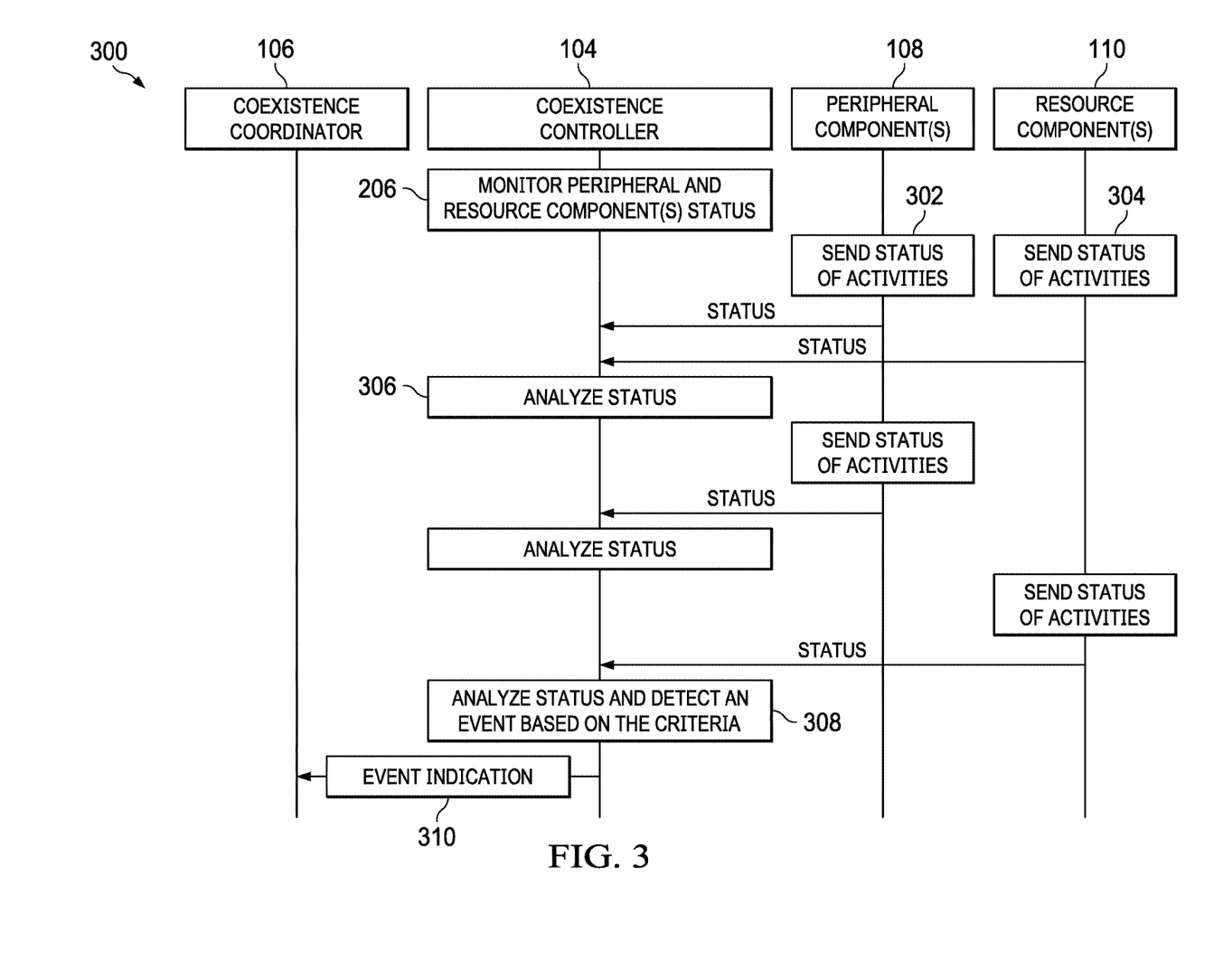
FIG. 3 is a timing diagram of a monitoring or coexistence event detection function implemented by a coexistence controller in accordance with various examples.

FIG. 3 is a timing diagram 300 that illustrates the monitoring or coexistence event detection function implemented by the coexistence controller 104. The monitoring function enables the coexistence controller 104 to detect coexistence events, which in turn enables various actions to be taken responsive to those coexistence events, such as modifying an operating point of the SoC 102 or otherwise mitigating the coexistence issues between peripheral component(s) 108 and/or resource component(s) 110 of the SoC 102.

The timing diagram 300 includes block 206, described above, in which the coexistence controller 104 is configured to begin monitoring the peripheral components 108 and/or the resource components 110 according to the coexistence event criteria specified by the events control engine 112 of the coexistence coordinator 106. Subsequently, at blocks 302 and 304, the coexistence controller 104 receives status messages from the peripheral component(s) 108 and/or the resource component(s) 110, respectively. The status messages indicate various parameters associated with activities being implemented by the peripheral component(s) 108 and/or the resource component(s) 110. For example, a BLE peripheral component 108 status message can include an indication of an output power parameter of the BLE peripheral component 108. As another example, an ADC peripheral component 108 status message can include an indication of a sampling rate parameter of the ADC peripheral component 108.

At block 306, the coexistence controller 104 analyzes the status messages provided at blocks 302 and 304. For example, the coexistence controller 104 compares indications of parameter values in the status messages to thresholds specified by the coexistence event criteria. As shown in FIG. 3, the peripheral component(s) 108 and the resource component(s) 110 continue to send status messages to the coexistence controller 104, which in turn continues to analyze those provided status messages.

At block 308, the coexistence controller 104 detects the occurrence of a coexistence event responsive to one or more status messages and the specified coexistence event criteria, described above. As described above, a coexistence event is an event or an action that impacts, influences, or otherwise changes an operating point of the SoC 102. The SoC 102 operating point is a combination of concurrent performance or operation capabilities of multiple SoC 102 components, such as the peripheral components 108 and/or the resource components 110. The SoC 102 operating point can be specified by the coexistence event criteria specified by the events control engine 112 of the coexistence coordinator 106, as described above. For example, the coexistence event criteria identify deviations from the desired SoC 102 operating point (e.g., throughput below a threshold, an activity has been delayed more than a threshold number of times, and the like). However, changing the SoC 102 operating point does not always include a change to the coexistence event criteria. For example, the coexistence controller 104 detects an event responsive to an activity having a throughput less than a threshold value. In response, the coexistence coordinator 106 determines to change the SoC 102 operating point, such as to increase the priority of the activity or allocate more time to carrying out the activity, which improves the throughput of the activity. However, the coexistence coordinator 106 does not reconfigure the coexistence controller 104 event detection criteria, and accordingly the coexistence controller 104 continues to monitor the activity throughput relative to the previously-used throughput threshold value. In another example, responsive to changing the SoC 102 operating point, the coexistence coordinator 106 reconfigures the coexistence controller 104 event detection criteria. For example, the reconfigured event detection criteria can include monitoring other activities that could be impacted by the increase in priority granted to the activity that caused the coexistence event described above (e.g., the activity whose throughput was less than the threshold value). As described above, the SoC 102 operating point satisfies a limiting factor, such as a total power consumption of the SoC 102, a thermal rise of the SoC 102, or a longevity or ability to maintain a performance level over time of the SoC 102.

In one example, reference is made to a BLE peripheral component 108 and an ADC peripheral component 108. In this example, an operation capability of the BLE peripheral component 108 is an output power value, with a greater output power representing a greater operation capability of the BLE peripheral component 108, and a lesser output power representing a lesser operation capability of the BLE peripheral component 108. Continuing this example, an operation capability of the ADC peripheral component 108 is a sampling rate value, with a greater sampling rate representing a greater operation capability of the ADC peripheral component 108, and a lesser sampling rate representing a lesser operation capability of the ADC peripheral component 108. In this example, the limiting factor for an operating point is a power consumption level for the SoC 102.

In one example, the coexistence controller 104 detects a coexistence event at block 308 responsive to a status message from the BLE peripheral component 108 indicating that the output power of the BLE peripheral component 108 is less than the expected value for a given operating point, which indicates a possible coexistence problem because the BLE peripheral component 108 is underperforming relative to its expected operation capability at the given operating point. For example, at a first operating point (e.g., which can be defined by the coexistence event criteria specified as described above), a coexistence event occurs when the output power of the BLE peripheral component 108 is less than a threshold specified by the coexistence event criteria.

Similarly, the coexistence controller 104 detects a coexistence event at block 308 responsive to a status message from the ADC peripheral component 108 indicating that the sampling rate of the ADC peripheral component 108 is less than the expected value for a given operating point, which indicates a possible coexistence problem because the ADC peripheral component 108 is underperforming relative to its expected operation capability at the given operating point. For example, at the first operating point, a coexistence event occurs when the sampling rate of the ADC peripheral component 108 is less than a threshold specified by the coexistence event criteria.

Irrespective of the type of coexistence event detected at block 308, at block 310, the coexistence controller 104 provides an indication of the occurrence of the coexistence event to the coexistence coordinator 106. In particular, a status control engine 114 of the coexistence coordinator 106 receives the indication of the occurrence of the coexistence event and determines action(s) to be taken in response to the coexistence event. Also, the status control engine 114 is configured to receive the status messages that indicate various parameters associated with activities being implemented by the peripheral component(s) 108 and/or the resource component(s) 110. For example, a BLE peripheral component 108 status message can include an indication of an output power parameter of the BLE peripheral component 108. As another example, an ADC peripheral component 108 status message can include an indication of a sampling rate parameter of the ADC peripheral component 108. In another example, the status control engine 114 is configured to receive occasional (e.g., periodic) status API messages that indicate an average throughput of an activity or activities per unit time (e.g., one minute), average power consumption of an activity or activities per unit time, or a number of times that an activity has been denied or delayed per unit time, and the like.

Figure 4:
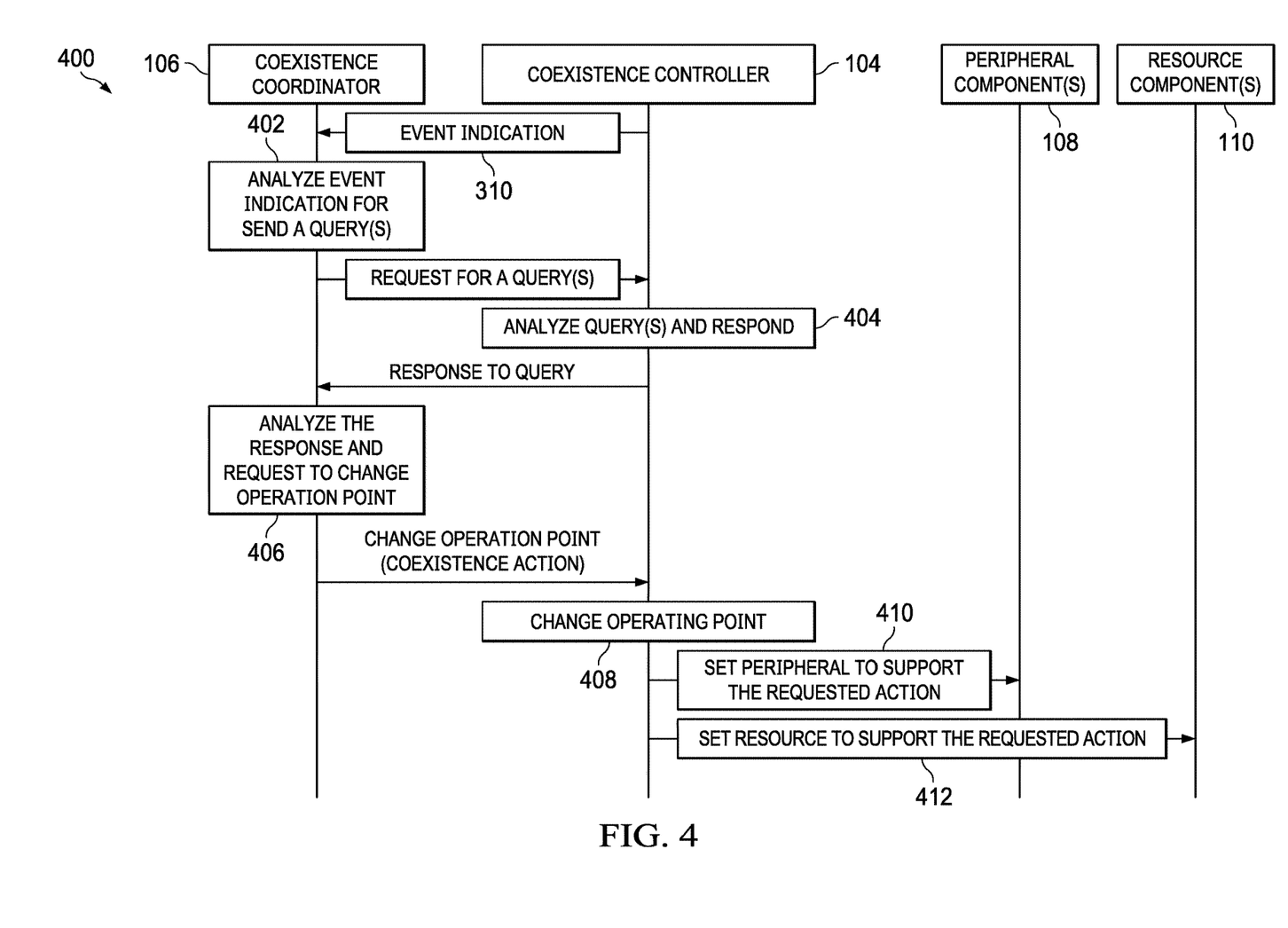
FIG. 4 is a timing diagram of query and coexistence action functions implemented by a coexistence coordinator and a coexistence controller in accordance with various examples.

FIG. 4 is a timing diagram 400 that illustrates query and coexistence action functions implemented by the coexistence coordinator 106 and the coexistence controller 104. The query and coexistence action functions are responsive to the occurrence of a coexistence event, such as that detected and indicated as described above.

The timing diagram 400 includes block 310, described above, in which the coexistence controller 104 provides an indication of the occurrence of the coexistence event to the coexistence coordinator 106. Subsequently, at block 402, and responsive to the indication of the occurrence of the coexistence event, the coexistence coordinator 106 is configured to provide a query to the coexistence controller 104. The query function can be implemented by a query engine 116 of the coexistence coordinator 106. The query function enables the query engine 116 to determine the result of taking a particular coexistence action. For example, if a throughput of a first activity is less than the threshold set by the coexistence event criteria, described above, the query engine 116 can be configured to issue a query to determine an impact (e.g., an expected throughput for the first activity, or impact on a second activity throughput) responsive to increasing a priority of the first activity. At block 404, the coexistence controller 104 receives the query and provides a response to the coexistence coordinator 106.

In some examples, the query engine 116 can be configured to issue additional queries following the response from the coexistence controller 104 at block 404. Some examples of other possible queries include determining an impact on power consumption of the electronic device 101/SoC 102 responsive to increasing activity throughput; determining an impact on latency of an activity responsive to increasing a priority of that activity; determining an impact on SoC 102 resource usage responsive to changing throughput and/or latency requirements for a particular activity; determining an average power consumption responsive to reducing an output power, required throughput, or resource usage of a particular activity; and determining an impact on SoC 102 performance responsive to reducing a resource usage for a particular activity. Irrespective of the particular content of a query, the coexistence controller 104 is configured to provide responses to such queries to enable the coexistence coordinator 106 to better inform subsequent coexistence decisions. In some examples, the coexistence coordinator 106 is configured to provide the results of such queries to a user, such as on a GUI 130 of the electronic device 101. The coexistence coordinator 106 can also be configured to receive user inputs to take a course of coexistence action, such as implementing one of multiple suggested coexistence actions provided by the coexistence coordinator 106 (e.g., on the GUI 130) in response to the occurrence of the coexistence event.

At block 406, a coexistence action engine 118 of the coexistence coordinator 106 is configured to request a change to the operating point of the SoC 102 (e.g., an operating point change request). As described above, in one example, the coexistence action engine 118 receives a user input (e.g., confirmation of one of multiple suggested coexistence actions) and provides the operating point change request responsive to the user input. In another example, the coexistence action engine 118 automatically (e.g., without being responsive to a user input) determines a coexistence action and provides the operating point change request responsive to such determination. For example, the coexistence action engine 118 can be configured to determine that a current SoC 102 operating point does not satisfy performance requirement(s) of one or more peripheral components 108 and/or resource components 110 of the SoC 102, and that a new SoC 102 operating point is available that better satisfies the performance requirement(s).

Irrespective of how the coexistence action engine 118 determines to provide the operating point change request, at block 408, the coexistence controller 104 receives the operating point change request and changes the operating point of the SoC 102. At block 410, the coexistence controller 104 causes the peripheral component(s) 108 to modify at least one operating metric. For example, the coexistence controller 104 can be configured to cause the BLE peripheral component 108 to reduce (or increase) its output power, or to cause the ADC peripheral component 108 to reduce (or increase) its sampling rate. At block 412, the coexistence controller 104 causes the resource component(s) 110 to modify at least one operating metric. For example, the coexistence controller 104 can be configured to cause a component, such as a peripheral component 108, to use more or less of a shared resource component 110, or cause the shared resource component 110 to limit its activity. For example, the coexistence controller 104 can be configured to cause a BLE peripheral component 108 to reduce (or increase) its use of a shared antenna interface (e.g., a shared resource component 110). In another example, the coexistence controller 104 can be configured to cause a power management shared resource component 110 to reduce (or increase) a voltage level of the SoC 102. The coexistence controller 104 can also be configured to limit (e.g., reduce or increase) a memory budget resource component 110 available to a specific peripheral component 108. In yet another example, the coexistence controller 104 can be configured to cause the power management shared resource component 110 to halt or throttle activity of one or more other peripheral components 108 and/or resource components 110 responsive to exceeding an allowable average power consumption. In an example, the coexistence controller 104 can also be configured to cause a temperature sensor shared resource component 110 to halt or throttle activity of one or more other peripheral components 108 and/or resource components 110 responsive to exceeding an allowable temperature level.

Accordingly, a user is able to have additional insight to or awareness of coexistence-related problems (or their impact on electronic device 101/SoC 102 performance) between peripheral components 108 and/or resource components 110 of the SoC 102. For example, the results of various queries issued by the query engine 116 can be displayed on a GUI 130 of the electronic device 101 for the user to view. Also, in at least some examples, the user is able to dynamically alter the operating point of the SoC 102 based on such insight or awareness, such as by selecting a new operating point from a list of available options on the GUI 130, which are responsive to the occurrence of a coexistence event detected by the coexistence controller 104.

The foregoing enables a user of the electronic device 101 to appreciate the potential impact(s) of an operating point change before deciding to make the change to the electronic device 101. As one example, the user may wish to increase battery performance of the electronic device 101, which has a resulting negative impact on the performance or operating capability of one or more peripheral components 108 (e.g., reducing BLE output power, reducing ADC sampling rate) and/or resource components 110. Responsive to the user query (e.g., implemented by the query engine 116) regarding increasing the battery performance of the electronic device 101, the coexistence controller 104 determines that BLE peripheral component 108 output power will need to be reduced, and/or that ADC peripheral component 108 sampling rate will need to be decreased, and provides an indication of those impacts to the user through the coexistence coordinator 106.

Figure 5:
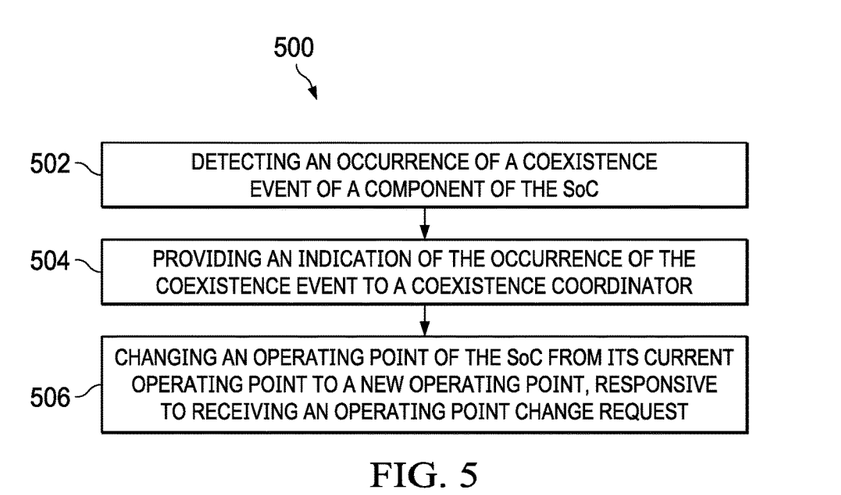
FIG. 5 is a flow chart of a method for detecting and handling a coexistence event in accordance with various examples.

FIG. 5 is a flow chart of a method 500 for detecting and handling a coexistence event in accordance with examples of this description. The method 500 begins in block 502 with detecting an occurrence of a coexistence event of a component of the SoC 102. As described above, the coexistence controller 104 is configured to detect coexistence events responsive to coexistence event criteria (e.g., a threshold) provided by the coexistence coordinator 106. For example, the coexistence controller 104 can detect the coexistence event responsive to status indications provided by the peripheral component(s) 108 and/or the resource component(s) 110, and the relation of those statuses to the coexistence event criteria or threshold.

The method 500 then continues in block 504 with providing an indication of the occurrence of the coexistence event to a coexistence coordinator. As described above, the coexistence controller 104 is configured to provide such an indication to the coexistence coordinator 106 responsive to detecting the coexistence event, which enables the coexistence coordinator 106 to determine an appropriate coexistence action (e.g., automatically or responsive to a user input) to address or mitigate the coexistence event.

The method 500 continues in block 506 with changing an operating point of the SoC from its current operating point to a new operating point, responsive to receiving an operating point change request. In particular, the coexistence controller 104 is configured to cause the peripheral component(s) 108 and/or the resource component(s) 110 to modify at least one operating metric responsive to the operating point change request from the coexistence coordinator 106.

In some examples, the method 500 includes various other functionality and steps described herein. Other examples of this description include a non-transitory, computer-readable medium containing instructions that, when executed by a processor (e.g., SoC 102), cause the processor to be configured to perform some or all of the steps of method 500. For example, the coexistence controller 104 is implemented by a processor (e.g., SoC 102) executing the instructions on the computer-readable medium to perform at least blocks 502, 504, and 506 of the method 500. Similarly, the coexistence coordinator 106 can be implemented by a processor (e.g., SoC 102 or another processor) executing the instructions on the computer-readable medium to perform the functionality described herein as being attributed to the coexistence coordinator 106.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Unless otherwise stated, "about," "approximately," or "substantially" preceding a value means +/−10 percent of the stated value. Modifications are possible in the described examples, and other examples are possible within the scope of the claims.

What is claimed is:

1. A method comprising:
   detecting, by a controller of a system on a chip (SoC), a first deviation of a value of a first SoC component of the SoC from a first target value;
   providing, by the controller, an indication of the first deviation to a coordinator; and
   changing, by the controller, an operating point of a second SoC component of the SoC responsive to receiving an operating point change request from the coordinator to decrease the first deviation, wherein the second SoC component comprises a Bluetooth Low Energy (BLE) component, wherein the first SoC component comprises an analog-to-digital converter (ADC), wherein the first target value is a target sampling rate so that detecting the first deviation comprises detecting a first sampling rate of the ADC being below the target sampling rate, and wherein changing the operating point of the second SoC component comprises decreasing an output power of the BLE component.

2. The method of claim 1, further comprising providing, by the controller, an indication of a new operating point of the second SoC component to the coordinator responsive to changing the operating point of the second SoC component to the new operating point.

3. The method of claim 1, wherein an electronic device comprises the SoC, and wherein the operating point change request is responsive to an input on a graphical user interface of the electronic device.

4. The method of claim 1, further comprising:
   receiving, by the controller from the coordinator, a query that specifies a proposed operating point change for the SoC;
   determining an impact of the proposed operating point change on the first and second SoC components; and
   providing an indication of the impact to the coordinator.

5. The method of claim 1, further comprising:
   receiving, by the controller from the coordinator, a request for a coexistence status report, wherein the request specifies a key performance indicator for the first SoC component; and
   providing, by the controller to the coordinator, the coexistence status report responsive to the request, wherein the coexistence status report includes a recommended operating point change for the SoC to achieve the specified key performance indicator.

6. A device comprising:
   a system on a chip (SoC) comprising first and second SoC components; and
   a controller coupled to the SoC, the controller configured to:
      detect a first deviation of a value of the first SoC component from a first target value;
      provide an indication of the first deviation to a coordinator; and
      change an operating point of the second SoC component responsive to receiving an operating point change request from the coordinator to decrease the first deviation, wherein the first SoC component comprises a Bluetooth Low Energy (BLE) component, wherein the second SoC component comprises an analog-to-digital converter (ADC), wherein the first target value is a target output power so that detecting the first deviation comprises detecting a first output power of the BLE component being below the target output power, and wherein changing the operating point of the second SoC component comprises decreasing a sampling frequency of the ADC.

7. The device of claim 6, wherein the controller is configured to provide an indication of a new operating point of the second SoC component to the coordinator responsive to changing the operating point of the second SoC component to the new operating point.

8. The device of claim 6, comprising a graphical user interface coupled to the SoC, wherein the operating point change request is responsive to an input on the graphical user interface.

9. The device of claim 6, wherein the controller is configured to:
   receive, from the coordinator, a query that specifies a proposed operating point change for the SoC;
   determine an impact of the proposed operating point change on a coexistence of the first and second SoC components; and
   provide an indication of the impact to the coordinator.

10. The device of claim 6, wherein the controller is configured to:
    receive, from the coordinator, a request for a coexistence status report specifying a key performance indicator for the first SoC component; and
    provide, to the coordinator, the coexistence status report responsive to the request, wherein the coexistence status report includes a recommended operating point change for the SoC to achieve the specified key performance indicator.

11. A non-transitory, computer-readable medium containing instructions that, when executed by a processor, cause the processor to be configured to:
    detect an occurrence of a coexistence event of a first deviation of a value of a first system on a chip (SoC) component of an SoC from a first target value;
    provide an indication of the first deviation to a coordinator; and
    change an operating point of a second SoC component of the SoC from a current operating point to a new operating point responsive to receiving an operating point change request from the coordinator, wherein the first SoC component comprises a Bluetooth Low Energy (BLE) component, wherein the second SoC component comprises an analog-to-digital converter (ADC), wherein the first target value is a target output power so that detecting the first deviation comprises detecting a first output power of the BLE component being below the target output power, and wherein changing the operating point of the second SoC component comprises decreasing a sampling frequency of the ADC.

12. The non-transitory, computer-readable medium of claim 11, wherein the instructions, when executed by the processor, cause the processor to be configured to provide an indication of the new operating point to the coordinator responsive to changing the operating point of the second SoC component to the new operating point.

13. The non-transitory, computer-readable medium of claim 11, wherein an electronic device comprises the SoC, and wherein the operating point change request is responsive to an input on a graphical user interface associated with the electronic device.

14. The non-transitory, computer-readable medium of claim 11, wherein the instructions, when executed by the processor, cause the processor to be configured to:
  receive, from the coordinator, a query that specifies a proposed operating point change for the SoC;
  determine an impact of the proposed operating point change on a coexistence of two or more SoC components of the SoC; and
  provide an indication of the impact to the coordinator.

15. A method comprising:
  detecting, by a controller of a system on a chip (SoC), a first deviation of a value of a first SoC component of the SoC from a first target value;
  providing, by the controller, an indication of the first deviation to a coordinator; and
  changing, by the controller, an operating point of a second SoC component of the SoC responsive to receiving an operating point change request from the coordinator to decrease the first deviation, wherein the first SoC component comprises a Bluetooth Low Energy (BLE) component, wherein the second SoC component comprises an analog-to-digital converter (ADC), wherein the first target value is a target output power so that detecting the first deviation comprises detecting a first output power of the BLE component being below the target output power, and wherein changing the operating point of the second SoC component comprises decreasing a sampling frequency of the ADC.

16. The method of claim 1, further comprising displaying the indication of the first deviation in a graphical user interface (GUI) of a device that comprises the SoC.

17. The method of claim 1, further comprising receiving, by the controller, a first status message from the first SoC component, wherein detecting the first deviation is based on the first status message.

18. The method of claim 17, wherein the first status message comprises an output power value, or a sampling rate value.

19. The method of claim 17, further comprising receiving periodic status messages from the first SoC component, wherein the first status message is one of the periodic status messages.

20. The method of claim 1, further comprising receiving an input via a graphical user interface (GUI) of a device comprising the SoC, wherein the operating point change request is based on the input received via the GUI.

21. The method of claim 1, wherein changing the operating point of the second SoC component comprises throttling the second SoC component.

22. The method of claim 4, wherein the proposed operating point change for the SoC specified by the query comprises decreasing battery usage of an electronic device that comprises the SoC.

* * * * *